(12) United States Patent
Nissila et al.

(10) Patent No.: US 9,806,862 B2
(45) Date of Patent: Oct. 31, 2017

(54) GROUPING OF CS AND COMB VALUES FOR DM-RS AND SRS ON SHARED TIME-FREQUENCY RESOURCES

(71) Applicant: Nokia Technologies Oy, Espoo (FI)

(72) Inventors: Mauri Nissila, Oulu (FI); Kari Hooli, Oulu (FI); Kari Pajukoski, Oulu (FI); Esa Tiirola, Kempele (FI)

(73) Assignee: Nokia Technologies Oy, Espoo (FI)

( * ) Notice: Subject to any disclaimer, the term of this patent is extended or adjusted under 35 U.S.C. 154(b) by 65 days.

(21) Appl. No.: 14/439,973

(22) PCT Filed: Dec. 21, 2012

(86) PCT No.: PCT/IB2012/057647
§ 371 (c)(1),
(2) Date: Apr. 30, 2015

(87) PCT Pub. No.: WO2014/096909
PCT Pub. Date: Jun. 26, 2014

(65) Prior Publication Data
US 2015/0312009 A1    Oct. 29, 2015

(51) Int. Cl.
*H04L 5/00* (2006.01)
*H04L 27/26* (2006.01)
(Continued)

(52) U.S. Cl.
CPC ............ *H04L 5/003* (2013.01); *H04B 7/024* (2013.01); *H04L 1/0048* (2013.01); *H04L 5/005* (2013.01);
(Continued)

(58) Field of Classification Search
CPC ....... H04B 7/024; H04L 1/0048; H04L 5/003; H04W 28/12; H04W 74/002
See application file for complete search history.

(56) References Cited

U.S. PATENT DOCUMENTS

| | | | |
|---|---|---|---|
| 8,718,001 B2* | 5/2014 | Zhang | H04L 1/0027 370/329 |
| 2011/0199944 A1* | 8/2011 | Chen | H04L 5/0007 370/280 |

(Continued)

FOREIGN PATENT DOCUMENTS

EP   2469947 A1   6/2012

OTHER PUBLICATIONS

International Search Report and Written Opinion received for corresponding Patent Cooperation Treaty Application No. PCT/IB2012/057647, dated Dec. 21, 2012, 11 pages.

(Continued)

*Primary Examiner* — Afshawn Towfighi
*Assistant Examiner* — Mewale Ambaye
(74) *Attorney, Agent, or Firm* — Harrington & Smith

(57) ABSTRACT

A method for grouping of CS (and comb values) for DM-RS and SRS on shared time-frequency resources is described. The method includes dividing a RS space into at least a first region and a second region. The method also includes allocating, from the first region, a DM-RS sequence CS and/or a DM-RS comb for a DM-RS; and allocating, from the second region, a SRS sequence CS and/or a SRS comb for a SRS. The DM-RS and the SRS are on the same resources on an uplink shared channel (such as a PUSCH for example). The RS space comprises at least one of a CS set and a IFDM comb set. The CS set and/or the IFDM comb set of the first region is based at least in part on a number of physical resource blocks allocated to the uplink shared channel. Apparatus and computer readable media are also described.

18 Claims, 8 Drawing Sheets

(51) Int. Cl.

| | |
|---|---|
| *H04B 7/024* | (2017.01) |
| *H04L 1/00* | (2006.01) |
| *H04W 28/12* | (2009.01) |
| *H04W 74/00* | (2009.01) |
| *H04L 25/02* | (2006.01) |

(52) U.S. Cl.
CPC ........ *H04L 5/0051* (2013.01); *H04L 27/2602* (2013.01); *H04W 28/12* (2013.01); *H04W 74/002* (2013.01); *H04L 25/0226* (2013.01)

(56) References Cited

U.S. PATENT DOCUMENTS

| | | | | |
|---|---|---|---|---|
| 2011/0267972 | A1* | 11/2011 | Yoon | H04L 5/0023 370/252 |
| 2012/0008556 | A1* | 1/2012 | Noh | H04L 1/1893 370/328 |
| 2012/0176999 | A1* | 7/2012 | Zhang | H04L 1/0027 370/329 |

OTHER PUBLICATIONS

NTT Docomo et al. "UL RS Enhancement for LTE-Advanced", 3GPP Draft; R1-094911 UL RS, 3rd Generation Partnership Project (3GPP), Mobile Competence Centre; 650, route Des Lucioles, F-06921 Sophia-Antipolis Cedex; France, no, Jeju Nov. 9, 2009, Nov. 9, 2009 (Nov. 3, 2009), XP050389274, [retrieved on Nov. 3, 2009].

* cited by examiner

| 410 Cyclic Shift Field in Uplink-Related DCI Format [3] | 420 $n^{(2)}_{DMRS,\lambda}$ | | | | 430 $[w^{(\lambda)}(0) \; w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 4 | 2 | n/a | n/a | n/a | n/a |
| 001 | 6 | 0 | 2 | 4 | n/a | n/a | n/a | n/a |
| 010 | 3/m | 1/m | 2/m | 0/m | n/a | n/a | n/a | n/a |
| 011 | 4/m | 10/m | 8/m | 6/m | n/a | n/a | n/a | n/a |
| 100 | 2/m | 0/m | 4/m | 6/m | n/a | n/a | n/a | n/a |
| 101 | 5/m | 7/m | 6/m | 8/m | n/a | n/a | n/a | n/a |
| 110 | 1/m | 3/m | 0 | 2m | [1 1] | [1 1] | [1 1] | [1 -1] |
| 111 | 9 | 3 | 0 | 6 | | | | |

440, 1 DM-RS PER SUBFRAME IS ASSUMED. OCC IS NOT APPLICABLE

450, OCC IS APPLICABLE AS ReL10 FALL BACK IS SIGNALED

| Cyclic Shift Field in Uplink-related DCI format [3] 710 | $n^{(2)}_{DMRS,\lambda}$ 720 | | | | $[w^{(\lambda)}(0)\ w^{(\lambda)}(1)]$ 730 | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 2 | 4 | 1 | n/a | n/a | n/a | n/a |
| 001 | 3 | 0 | 6 | 9 | n/a | n/a | n/a | n/a |
| 010 | 2 | 4 | 0 | 5 | n/a | n/a | n/a | n/a |
| 011 | 4 | 5 | 3 | 2 | n/a | n/a | n/a | n/a |
| 100 | 1 | 0 | 2 | 3 | n/a | n/a | n/a | n/a |
| 101 | 6 | 8 | 7 | 9 | n/a | n/a | n/a | n/a |
| 110 | 7 | 9 | 8 | 6 | n/a | n/a | n/a | n/a |
| 111 | 9 | 3 | 0 | 6 | [1 1] | [1 1] | [1 -1] | [1 -1] |

740, 1 DM-RS PER SUBFRAME IS ASSUMED. OCC IS NOT APPLICABLE

750, OCC IS APPLICABLE AS Rel10 FALL BACK IS SIGNALED

GROUPING OF CS AND COMB VALUES FOR DM-RS AND SRS ON SHARED TIME-FREQUENCY RESOURCES

RELATED APPLICATION

This application was originally filed as Patent Cooperation Treaty Application No. PCT/IB2012/057647 filed Dec. 21, 2012.

TECHNICAL FIELD

The exemplary and non-limiting embodiments relate generally to wireless communication systems, methods, devices and computer programs and, more specifically, relate to grouping of CS and comb values for DM-RS and SRS on shared time-frequency resources.

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Radio propagation characteristics in small cells are typically very different from propagation characteristics in large cells. This difference can be taken advantage of when optimizing reference signal (RS) arrangements for small cells. Most importantly, this opens possibilities for reducing the transmission overhead due to RSs in the uplink (UL) direction.

What are needed are techniques to provide RS arrangements for small cells which take specific advantage of the characteristics of the small cells.

SUMMARY

The below summary section is intended to be merely exemplary and non-limiting.

The foregoing and other problems are overcome, and other advantages are realized, by the use of the exemplary embodiments.

In a first aspect thereof an exemplary embodiment provides a method for grouping of CS (and comb values) for DM-RS and SRS on shared time-frequency resources. The method includes dividing a RS space into at least a first region and a second region. The method also includes allocating, from the first region, a DM-RS CS for a DM-RS sequence; and allocating, from the second region, a SRS CS for a SRS sequence. The DM-RS sequence and the SRS sequence are on the same resources on an uplink shared channel (such as a PUSCH for example). The resolution of the RS space is based at least in part on a number of physical resource blocks allocated to the uplink shared channel.

In a further aspect thereof an exemplary embodiment provides an apparatus for grouping of CS (and comb values) for DM-RS and SRS on shared time-frequency resources. The apparatus includes at least one processor; and at least one memory storing computer program code. The at least one memory and the computer program code are configured to, with the at least one processor, cause the apparatus to perform actions. The actions include to divide a RS space into at least a first region and a second region. The actions also include to allocate, from the first region, a DM-RS CS for a DM-RS sequence; and to allocate, from the second region, a SRS CS for a SRS sequence. The DM-RS sequence and the SRS sequence are on the same resources on an uplink shared channel (such as a PUSCH for example). The resolution of the RS space is based at least in part on a number of physical resource blocks allocated to the uplink shared channel.

In another aspect thereof an exemplary embodiment provides a computer readable medium for grouping of CS (and comb values) for DM-RS and SRS on shared time-frequency resources. The computer readable medium is tangibly encoded with a computer program executable by a processor to perform actions. The actions include dividing a RS space into at least a first region and a second region. The actions also include allocating, from the first region, a DM-RS CS for a DM-RS sequence; and allocating, from the second region, a SRS CS for a SRS sequence. The DM-RS sequence and the SRS sequence are on the same resources on an uplink shared channel (such as a PUSCH for example). The resolution of the RS space is based at least in part on a number of physical resource blocks allocated to the uplink shared channel.

In a further aspect thereof an exemplary embodiment provides an apparatus for grouping of CS (and comb values) for DM-RS and SRS on shared time-frequency resources. The apparatus includes means for dividing a RS space into at least a first region and a second region. The apparatus also includes means for allocating, from the first region, a DM-RS CS for a DM-RS sequence; and means for allocating, from the second region, a SRS CS for a SRS sequence. The DM-RS sequence and the SRS sequence are on the same resources on an uplink shared channel (such as a PUSCH for example). The resolution of the RS space is based at least in part on a number of physical resource blocks allocated to the uplink shared channel.

BRIEF DESCRIPTION OF THE DRAWINGS

The foregoing and other aspects of exemplary embodiments are made more evident in the following Detailed Description, when read in conjunction with the attached Drawing Figures, wherein:

FIG. 4 illustrates an exemplary cyclic shift configuration signaling for DM-RS.

FIG. 7 illustrates another exemplary cyclic shift configuration signaling for DM-RS.

DETAILED DESCRIPTION

The same DM-RS sequence group may be assigned to a number of neighboring cells. The DM-RS sequences of different users may then be orthogonalized by applying different cyclic shifts (CS) to the common base sequence. However, there are typically unused DM-RS resources both in the frequency and CS domains.

Various exemplary embodiments facilitate RS overhead reduction in small cell deployments. Various exemplary embodiments enable the use of SRS sequences (such as, RS sequences used for channel sounding purposes) that can be mapped onto the same resources as DM-RS sequences (such as, RS sequences used to support data demodulation) in a highly flexible way (such as, without strict scheduling limitations for example) while satisfying multiplexing capacity requirements of SRS. Some exemplary embodiments also allow for sufficient sequence length even with narrow PRB allocation, hence, supporting a number of base sequence groups that enable cost-efficient deployment without challenging sequence planning.

Figure 1:
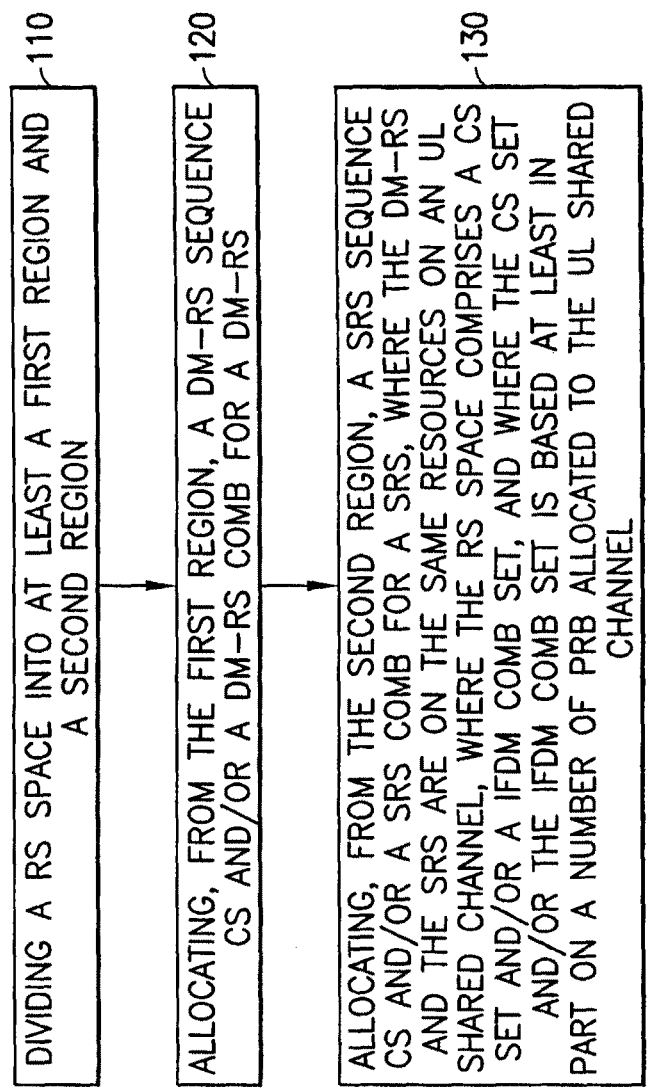
FIG. 1 is a logic flow diagram that illustrates the operation of an exemplary method, and a result of execution of computer program instructions embodied on a computer readable memory, in accordance with various exemplary embodiments.

FIG. 1 is a logic flow diagram that illustrates the operation of a method, and a result of execution of computer program instructions, in accordance with exemplary embodiments. In accordance with these exemplary embodiments a method performs, at Block 110, a step of dividing a RS space into at least a first region and a second region. The method performs, at Block 120, a step of allocating, from the first region, at least one of a DM-RS sequence CS and a DM-RS comb for a DM-RS and, at Block 130, a step of allocating, from the second region, at least one of a SRS sequence CS and a SRS comb for a SRS. The DM-RS and the SRS are on the same resources on a UL shared channel. The RS space includes a CS set and/or a IFDM comb set. The CS set and/or the IFDM comb set of the first region is based at least in part on a number of PRBs allocated to the UL shared channel.

The reference signal space may be defined by a set of CS and/or IFDM combs. The reference signal space is a space that can be configured, such that it may exclude some cyclic shifts that are mathematically defined for a RS sequence.

The various blocks shown in FIG. 1 may be viewed as method steps, and/or as operations that result from operation of computer program code, and/or as a plurality of coupled logic circuit elements constructed to carry out the associated function(s).

In order to facilitate the accommodation of DM-RS and SRS sequences on the same time-frequency resources (or REs), various exemplary embodiments enable increasing the dimensionality of the RS space over the conventional value (such as limited to 12 CSs) and, additionally, allow introduction of interleaved frequency division multiple access (IFDMA) arrangements to separate DM-RS and SRS resources in the frequency domain while continuing to support dynamic scheduling of narrow PRB allocations with sufficient DM-RS properties and high multiplexing capacity.

Various exemplary embodiments allow the RS CS resolution and/or RPF to depend on the number of allocated PUSCH PRBs.

The common RS resource space, which may be spanned by all possible CS and IFDMA comb values, is divided into two groups (either distinct or partially overlapping). One group of CS/comb values is used for DM-RS sequences and the other group is used to SRS sequences.

The resolution of CS values for both SRS and DM-RS on wide PUSCH allocations (such as a PUSCH allocation of 2 or more PRBs) may be smaller than the resolution of CS values for DM-RS on narrow PUSCH allocations (such as PUSCH allocation of 1 or 2 PRBs). The resolution of repetition factor (RPF) for both SRS and DM-RS on wide PUSCH allocations may be larger than the RPF for DM-RS on narrow PUSCH allocations. Accordingly, the number of CS/comb values available for the SRS can be much larger than that of for DM-RS for narrow PUSCH allocations.

In small cells, the orthogonality between RS sequences that have CS values which are close to each other is made possible by a large coherence BW inherent to small cells. The large coherence BW also allows for the use of larger RPFs. Use of smaller CS resolution and/or higher RPF for DM RS releases a larger portion of common RS resource space, such as for opportunistic aperiodic SRS usage.

Allocation of DM-RS and SRS resources can be dynamic or semi-static. Same control signaling field(s) (such as CSI for DM-RS) may be used for both larger and narrow PRB allocations. Interpretation of control signaling may then be dependent on the number of allocated PRBs.

In case of co-allocation with short DM-RS sequences (such as, a DM-RS sequence of length 12 or 6) corresponding to PUSCH allocations of one PRB, the CS values for simultaneously co-allocated longer DM-RS sequences may be selected from the CS sub-set such that the short DM-RS sequences are orthogonal in order to ensure that the short DM-RS sequences do not suffer from interference caused by other co-allocated DM-RS sequences.

In order to mitigate interference caused by SRS sequences to co-allocated short DM-RS sequence, a power offset between DM-RS sequences and SRS sequences may be provided. The transmit power of the SRS sequence can be much lower than the transmit power of the DM-RS sequence since channel estimation quality for SRS-based scheduling decisions may be lower than the channel estimation quality for PUSCH demodulation.

Additionally, CS values that are not orthogonal with short DM-RS sequences may be allocated to aperiodic SRS. Those aperiodic SRS configurations may then be allocated so that they are not used simultaneously with short DM-RS sequences.

One possibility to reduce RS overhead in UL is to co-allocate DM-RS sequences and SRS sequences onto the same time-frequency resources, such as, to use DM-RS symbols either to accommodate both DM-RS and SRS sequences. Since a DM-RS sequence of an UE occupies only those frequency pins of DM-RS symbol which are allocated to an uplink channel transmission (such as a PUSCH transmission for example) of that UE, there may be some unused frequency pins in the DM-RS symbol space at any given subframe. In addition, a number of mutually orthogonal DM-RS sequences can be allocated to the same PRBs by applying appropriately defined CSs to the DM-RS base sequence.

This may be exploited by allocating orthogonal DM-RS sequences, where orthogonality is obtained via different CSs, to the different transmission antenna ports of a UE when the UE is configured for multi-stream transmission mode. In conventional techniques, 12 different CS values are defined for DM-RS allowing, in principle, allocation of up to only 12 orthogonal sequences onto the same frequency pins (From these 12 sequences, only 8 can be simultaneously allocated within a single cell.).

However, in order to restore the orthogonality of sequences at the eNB receiver, the received signal is correlated with DM-RS sequences over at least 12 frequency pins, corresponding to one PRB. The CS resolution, the minimum difference in time domain between CSs in the set of DM-RS sequences that the eNB can configure (such as, $1/(15*12)$ ms=5.56 us for example) may thus be fully exploited if the channel is roughly constant over the PRB. While this requirement is easily met at small cells, large cells do not often meet it. Therefore, only 4 CS values, which are maximally separated from each other, are generally used in conventional DM-RS definitions, this causes averaging over only 4 frequency pins at the receiver in order to restore orthogonality.

These unused DM-RS resources may be used for sounding purposes, in order to increase sounding capacity, especially in cooperative multiple point (CoMP) scenarios. In a large scale deployment of small cells, where the coherence BW of the channel is typically much larger in small cells than in large cells, it is desirable to exploit unused DM-RS resources for such sounding purposes. It is also possible to fully replace the SRS symbol by integrating DM-RS and SRS sequences into the same resources (such as, resource elements (RE)) in order to reduce the overhead due to UL RS. However, in conventional systems orthogonality of sequences via CSing is valid for sequences which are of equal length and are allocated into the same REs and the dimensionality of the RS space may be too small to accommodate a required amount of SRS sequences at any particular subframe.

For aperiodic SRS triggering, UE transmit SRS according to RRC configured parameters when the UE receives a positive SRS trigger (such as via the PDCCH or EPDCCH). However, when the eNB triggers an aperiodic SRS, the eNB selects from two pre-configured parameter sets (for a single transmission antenna FDD terminal). These pre-configured parameter sets are associated separately to DL and UL scheduling grants. Thus, the eNB has extremely limited ability to trigger aperiodic SRS simultaneously for UEs having the same CS and frequency pin configuration. Such aperiodic SRS scheduling restriction can be effectively alleviated by increasing the number of available CSs, reducing the CS collision probability.

Figure 2:
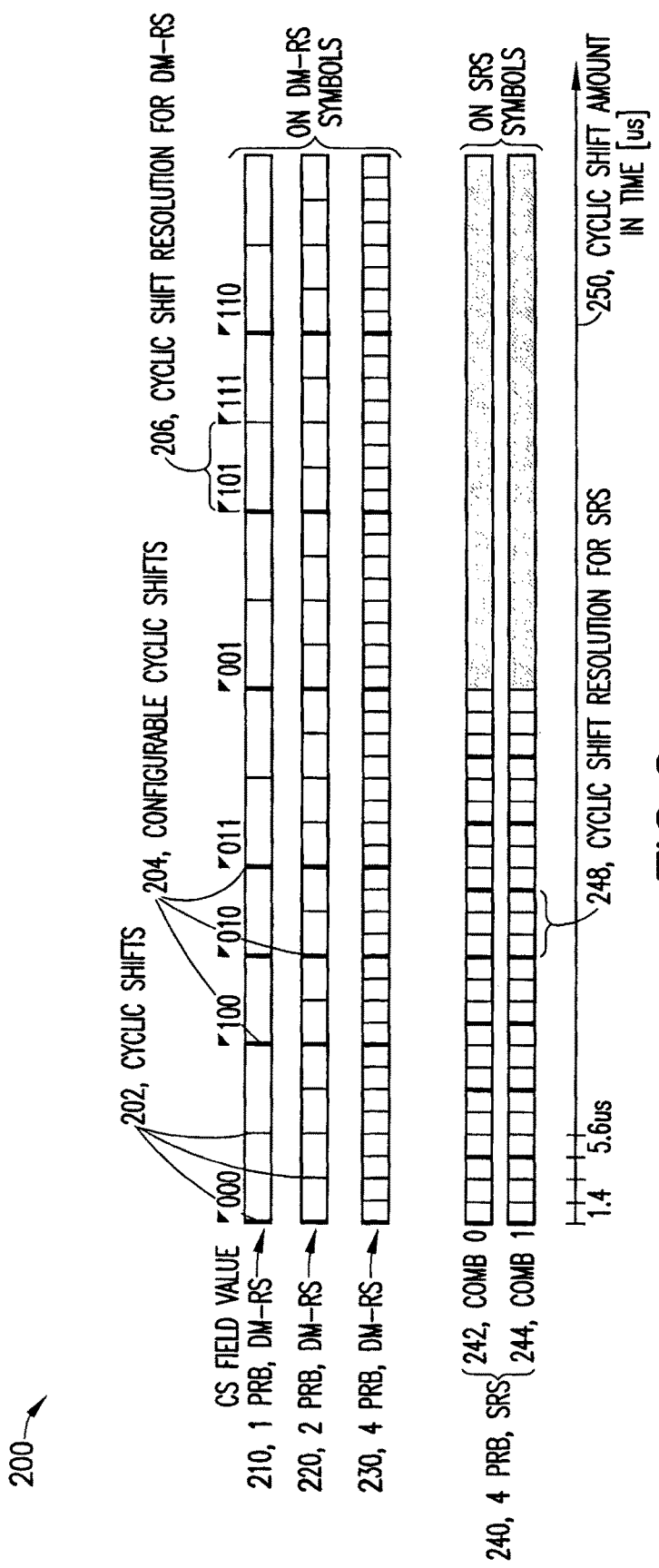
FIG. 2 illustrates an exemplary DM-RS and SRS cyclic shift configuration.

FIG. 2 illustrates an exemplary DM-RS and SRS cyclic shift configuration 200. As shown, the x-axis 250 represents the amount of shift in time. Drawn vertical lines represent orthogonal CSs 202 for a given sequence. CS fields for DM-RS sequences with 1, 2, and 4 PRB allocations (CS ranges 210, 220, 230 respectively) are presented. With a larger PRB allocation (having a shorter symbol duration), smaller CSing is enough to provide an orthogonal CS of the sequence. This allows the CS resolution for DM-RS 206 to be finer for larger PRB allocation. Some vertical lines 204 indicate those CSs that can be configured in a UE-specific manner (where the CS field values used for DM-RS CS configuration are also represented).

As shown in FIG. 2, CSs for 4 PRB SRS sequences are also presented in CS range 240. When using SRS, the SRS sequence is repeated twice (in the time domain) in order to generate IFDM comb structure in frequency (comb 0 (242) and comb 1 (244)). Due to this repetition, half of the CS range 240 is shaded with grey as CSs in this range would just reproduce a CS presented by another vertical line. The CS resolution for SRS 248 is approximately the same as CS resolution for DM-RS 206 in the 4 PRB allocation cases (230, 240).

Figure 3:
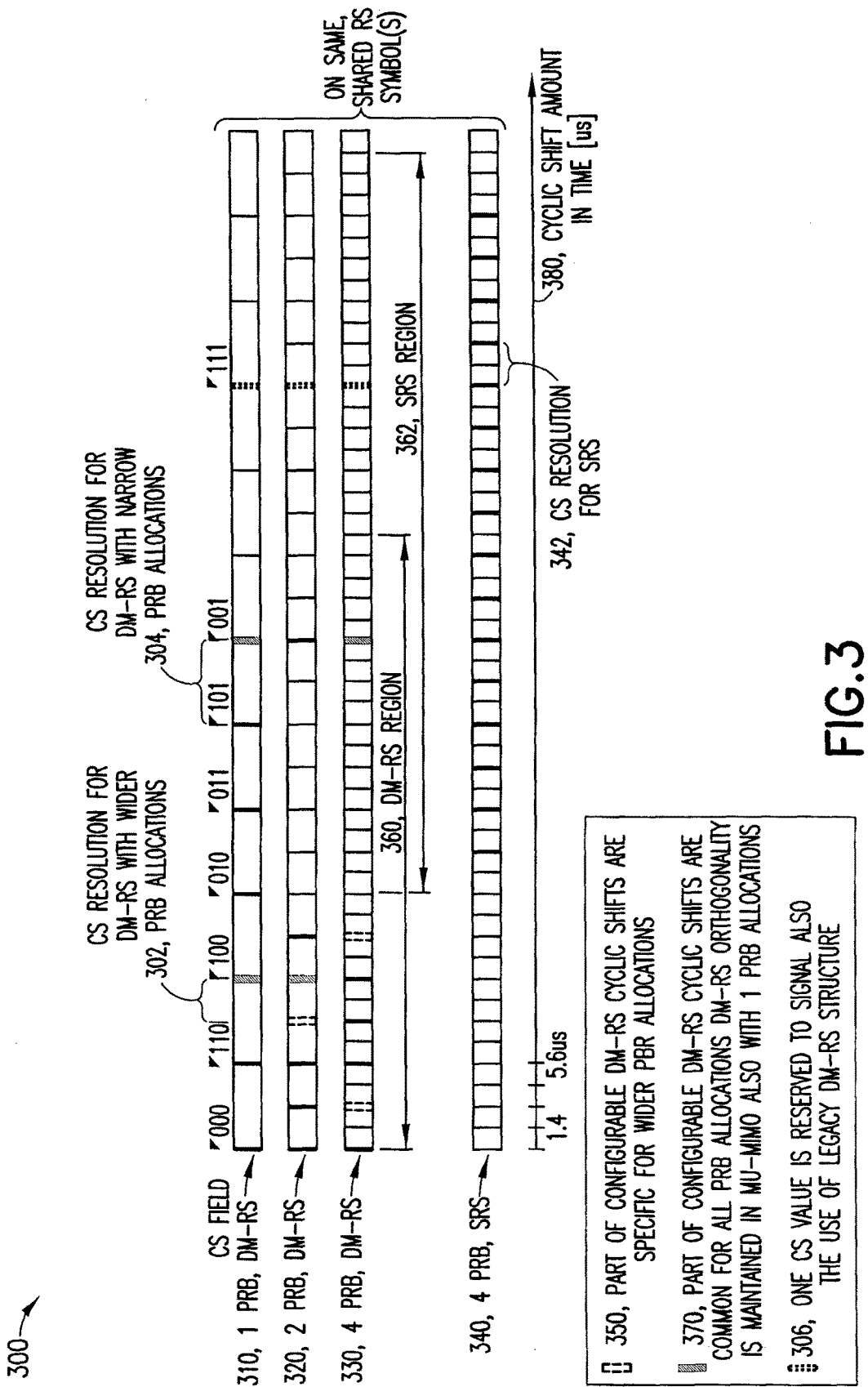
FIG. 3 illustrates an exemplary embodiment of a cyclic shift configuration for DM-RS and SRS.

FIG. 3 illustrates an exemplary embodiment of a cyclic shift configuration 300 for DM-RS and SRS. CS fields for DM-RS sequences with 1, 2, and 4 PRB allocations (CS ranges 310, 320, 330 respectively) and a CS field for SRS sequences with 4 PRB allocations (CS range 340) are presented. As with FIG. 2, the x-axis 380 represents the amount of shift in time.

The RS space is divided into two, partially overlapping, groups (or regions) 302, 304—a first for DM-RS 360 and a second for SRS 362. To increase the number of available CS resources and to reduce the overlap between DM-RS and SRS, a smaller CS resolution 302 may be used with SRS and DM-RS with wider PRB allocations, while a larger CS resolution 304 may be used with SRS and DM-RS with narrower PRB allocations.

While some CS 360 are common across the CS ranges (310, 320, 330), a subset of the CSs 350 are specific to the wider PRB allocations (due to the higher resolution). Part of the configurable DM-RS CSs range may be reserved for all PRB allocations. This range 305 may be used to support MU-MIMO pairing with orthogonal DM-RS (without PRB allocation restrictions).

SRS CS values that overlap with DM-RS CSs may be used for aperiodic SRS configurations. Other SRS CS values can be used both in aperiodic and periodic SRS configurations.

In the exemplary embodiment, the DM-RS CS may be configured with a 3-bit CS field and the SRS CS may be configured with a 4-bit field.

In a non-limiting example, a CS field value 306 is reserved to signal fall-back to Rel-11 DM-RS configuration with a static, predefined CS value (such as one of those values from the subset 360). This CS field value 306 is used for UEs in cell-edge conditions, or for MU-MIMO pairing with legacy UEs (which can be configured to use appropriate, non-overlapping CS value).

Scheduling of legacy UE DM-RS and periodic SRS may be performed on the same REs results in non-orthogonal RS structure and degraded channel estimates. Thus, periodic SRS using DM-RS REs may not be configured for all subframes. Additionally, legacy UE and periodic SRS collisions can be avoided with appropriate PUSCH scheduling.

In the exemplary embodiment of FIG. 3, 22 orthogonal CS resources can be configured for DM-RS and SRS.

FIG. 4 illustrates an exemplary cyclic shift configuration 400 signaling for DM-RS. The exemplary cyclic shift configuration 400 is based on existing CS fields in DCI0/4. On the example, different CS fields are optimized for SU-MIMO UEs for various scenarios; some CS fields provide orthogonality with 1 PRB allocations, while others optimize high-rank MU-MIMO and/or co-allocation with SRS.

For each CS value in the Cyclic shift field 410, a variety of values 420 are provided for multiple index values ($\lambda$) and (as described below) OCC values 430 may be provided for multiple $\lambda$.

The CS value may be defined based on various factors, such as, $\alpha_\lambda = 2\pi n_{cs,\lambda}/12$ with $n_{cs,\lambda} = (n_{DMRS,\lambda}^{(1)} + n_{DMRS,\lambda}^{(2)} + n_{PN}(n_s)) \bmod 12$, for example. Smaller CS resolution is achieved with a parameter m. In this non-limiting example, m=1 for 1 PRB allocation and m=2 for wider PRB allocations. All CS field values can be applied on all PRB allocations.

CS field values of 000 and 001 are targeted to conditions where the delay spread is large enough to prevent the use of tightly spaced CSs. These CS field values are also SU-MIMO optimized for such environments so that CS separation is maximized between different transmission layers of a single UE. A single UE (such as one with rank 4 for example) can occupy the whole DM-RS CS region. These DM-RS configurations are also orthogonal with 1 PRB DM-RS configurations.

CS field values of 010 and 110 is targeted for co-allocation with SRS and may be used for high rank MU/SU-MIMO in small delay spread environments. Up to rank-4 SU-MIMO DM-RS may occupy a part of DM-RS region, leaving a portion of the RS space free for DM-RS from another co-allocated UE and/or SRS. These DM-RS configurations may not be orthogonal with 1 PRB DM-RS when applied to wider PRB allocation.

CS field values of 011 and 100 provide DM-RS configurations that are orthogonal with 1 PRB DM-RS when applied for wider PRB allocation, as larger CS resolution is used. They also form a suitable configuration pair for MU-MIMO between two SU-MIMO terminals using multi-layer transmission. In this case, both terminals can use rank-2 transmission in MU-MIMO configurations.

The CS field value of 101 is targeted for co-allocation with high rank MU/SU-MIMO in small delay spread environments. Multi-layer SU-MIMO allocations may occupy CSs in DM-RS region that are not configurable for rank-1 terminals with wider PRB allocations. When two SU-MIMO terminals are co-allocated with CS fields 101 and 010 (or 110), up to rank-8 MU-MIMO (2×rank-4 SU-MIMO) can be supported with 11 simultaneously scheduled SRS transmissions. This DM-RS configuration may not be orthogonal with 1 PRB DM-RS when applied for wider PRB allocation.

A CS field value of 111 may be used with DM-RS configurations where there is only 1 DM-RS symbol in a subframe. This configuration may be used as a 'fall-back configuration' to be used with legacy UE.

While, there is no need to define OCC when there is only 1 DM-RS symbol in subframe (area 440), OCC are defined for the fall-back configuration 111 (area 450).

SRS transmissions in neighboring cells on the same REs as DM-RS appear as inter-cell interference. Interference estimation may be biased (such as in PUSCH detection and decoding) due to excess interference from SRS transmissions in addition to DM-RS transmissions on the neighboring cell eNB. This may have a degrading impact on throughput which can be mitigated by use of proper power offset between DM-RS and SRS. Such offset is configured so that the SRS is not received at unnecessarily high SINR.

The eNB can also avoid DM-RS RE "overloading" with many simultaneous SRS transmissions. Increased SRS multiplexing capacity can provide more flexible aperiodic SRS triggering due to reduced probability of CS collisions.

When the CS value belongs to the CS set defined for the larger CS resolution the SRS CS may not be orthogonal to DM-RS having narrow PRB allocation. However, the non-limiting embodiment allows considerable CS difference between DM-RS and SRS and, thus, providing considerable attenuation between sequences in channel estimation (such as approximately 20 dB). This is sufficient in most of cases to avoid channel estimation degradation with narrow PRB allocation.

In another exemplary embodiment, IFDMA is used with a repetition factor (RPF) which is based on the PRB allocation.

Figure 5:
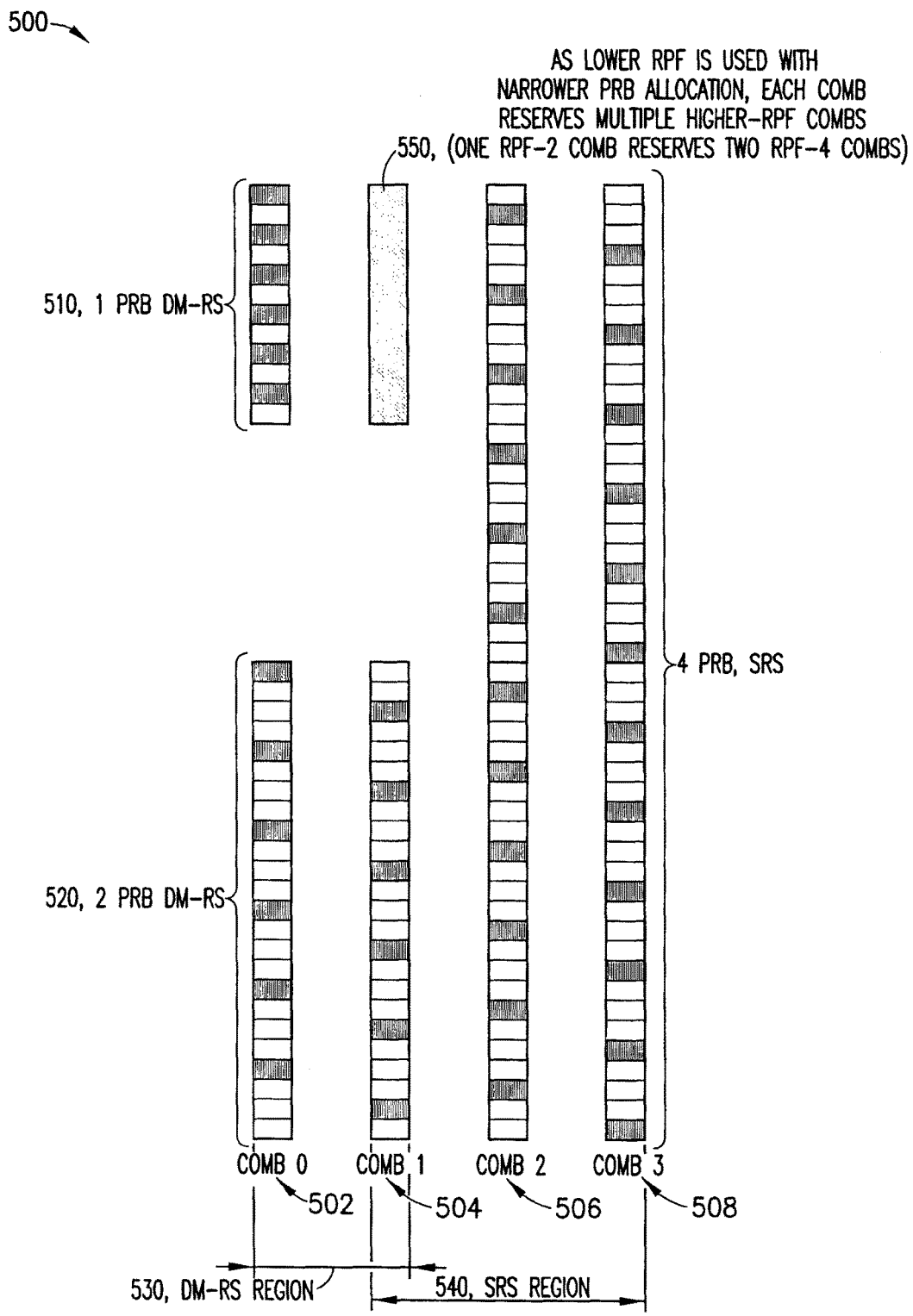
FIG. 5 illustrates an exemplary IFDMA comb arrangement for DM-RS and SRS.

FIG. 5 illustrates an exemplary IFDMA comb structure 500 (or subcarrier allocation) for DM-RS and SRS. As shown, there are 4 combs 502, 504, 506, 508 with a RPF of 4. The combs 502, 504, 506, 508 are divided into two, partially overlapping, groups (or regions)—a first region for DM-RS 530 and a second region for SRS 540. As shown, comb 1 (504) is in both regions (530, 540). Comb 0 (502) is separated into two sections, a first section for DM-RS with 1 PBR 510 and another section for DM-RS with 2 PBR 520.

A narrow PRB allocation may use a low RPF (such as a RPF of 2 for example). This means that each narrow band PRB consumes 2 combs from RPF 2. A lower RPF value allows a sufficient number of base sequences for RS sequence design while having reasonable inter-cell cross-correlation properties (which may become problematic with extremely short sequences). In order to avoid scheduling complications for PUSCH with narrow PRB allocation, periodic SRS are configured on SRS specific combs while aperiodic SRS can use combs that are shared with DM-RS.

The DM-RS combs 502, 504 can be used for PUSCH interference estimation in neighboring cells. Neighboring cell SRS transmissions on different, SRS-specific combs 506, 508 do not use biasing term for the interference estimation. Aperiodic SRS transmissions on the shared comb 504 can use proper SRS power offset and present reasonable (or limited) load so that any interference estimation bias term remains insignificant (in a throughput sense) in the neighboring cells.

Figure 6:
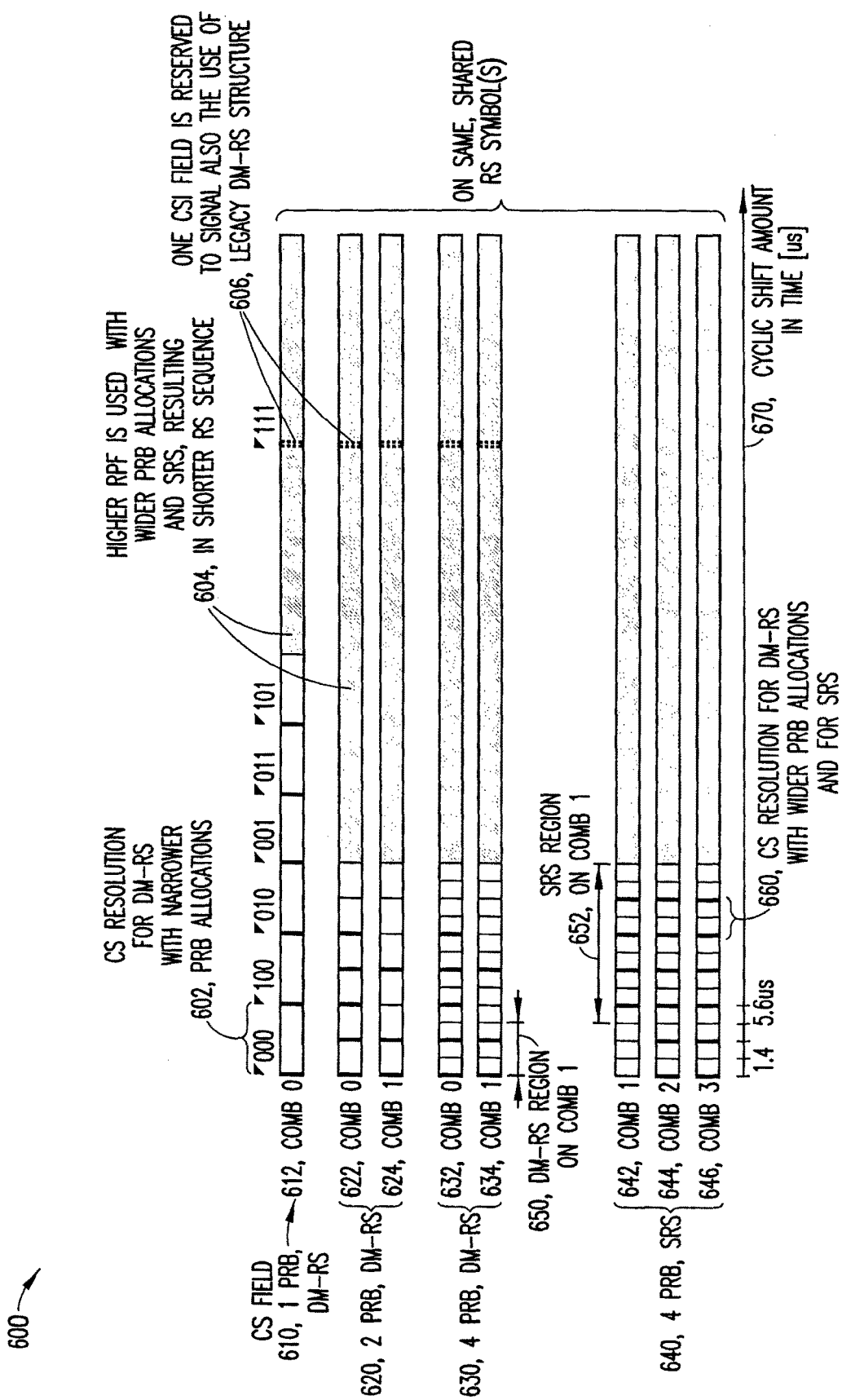
FIG. 6 illustrates another exemplary IFDMA comb and cyclic shift configuration for DM-RS and SRS.

FIG. 6 illustrates another exemplary IFDMA comb and cyclic shift configuration 600 for DM-RS and SRS. CS fields for DM-RS sequences with 1, 2, and 4 PRB allocations (CS ranges 610, 620, 630 respectively) and a CS field for SRS sequences with 4 PRB allocations (CS range 640) are presented. Each CS field 610, 620, 630, 640 may be divided into a DM-RS region 650 and a SRS region 652. As with FIGS. 2 and 3, the x-axis 670 represents the amount of shift in time.

The CS fields 610, 620, 630, 640 may be divided into one or more combs. For example, CS field 610 has one: comb 0 (612), CS fields 620, 630 have two combs each: a comb 0 (622, 632) and a comb 1 (624, 634), and CS field 640 has three: comb 0 (642), comb 1 (644) and comb 2 (646).

When higher RPF are used with wider PRB allocations and SRS, the RS sequence is shortened. This is represented by shaded area 604.

To increase the number of available CS resources, smaller CS resolution is used with SRS 660 and DM-RS 602 with wider PRB allocations.

Configurable CSs are the same for DM-RS with wider PRB allocations and SRS. This allows for DM-RS and/or SRS allocations with different PRB widths to be multiplexed with CSs.

In this non-limiting example, the DM-RS CS (and related combs) is configured with a 3-bit field (such as in Rel-11) and the SRS CS (and related combs) is configured with a 4-bit field.

One CS field value 606 is reserved to signal a 'fall-back'-instructing the UE to use a legacy DM-RS configuration with a static, predefined CS value. This can be used for UEs on cell-edge conditions, or for MU-MIMO pairing with legacy UEs (which can be configured to use appropriate, non-overlapping CS value). Scheduling of legacy UE DM-RS and periodic SRS on the same REs may result in a non-orthogonal RS structure and degraded channel estimates. Periodic SRS using DM-RS REs may be avoided in some subframes. Thus, legacy UE and periodic SRS collisions can be avoided with PUSCH scheduling restrictions.

FIG. 7 illustrates another exemplary cyclic shift configuration signaling for DM-RS. For each CS value in the Cyclic shift field 710, a variety of values 720 are provided for multiple index values (λ) and (as described below) OCC values 730 may be provided for multiple λ.

The CS may be defined as, $\alpha_\lambda = \alpha \pi n_{cs,\lambda}/6$ where $n_{cs,\lambda}$ may (or may not) depend on multiple variables, such as, $n_{cs,\lambda} = (n_{DMRS}^{(1)} + n_{DMRS,\lambda}^{(2b)} + n_{PN}(n_s)) \mod 6$. $n_{DMRS,\lambda}^{(2b)}$ can be derived from the values in FIG. 7 by $n_{DMRS,\lambda}^{(2b)} = (n_{DMRS,\lambda}^{(2)} \mod 6)/m$, where m is 1 for DM-RS allocations with RPF 2 (1 PRB allocation) and m is 2 for DM-RS allocations with RPF 4 (wider PRB allocations). The comb index (0 or 1) can be derived using the following equation: $n_{DMRS,Comb} = \lfloor n_{DMRS,\lambda}^{(2)}/6 \rfloor * (m-1)$.

In order to support flexible MU-MIMO pairing with 1 PRB allocations, one CS field for all PRB allocations may be reserved to indicate a RPF of 2. As a non-limiting example, such a CS field value can be 000. The DM-RS for different UEs may be orthogonally multiplexed with CSs (such as within comb 0). The CS field for a UE with 1 PRB allocation can be used to select proper CS for pairing.

CS field values of 000 and 010 may be used to signal that all layers of SU-MIMO UE are to use CSs on a comb 0. With a wider PRB allocation, this leaves comb 1 free for MU-MIMO or aperiodic SRS.

A CS field value of 001 may be used to signal that 2 layers of SU-MIMO UE may use CSs of the same comb. This provides a robust SU-MIMO configuration for environments with larger delay spread.

CS field values of 011 and 100 may be used to signal that layers of SU-MIMO UE are to use CSs on comb 0. With wider PRB allocation, this leaves comb 1 free for MU-MIMO or aperiodic SRS as with CS field values of 000 and 010. Additionally (in contrast to CS field values of 011 and 100), the UEs may use dense a CS allocation for the layers of SU-MIMO UE, so that MU-MIMO pairing of multi-layer SU-MIMO terminals on the same comb can be considered.

CS field values of 101 and 110 may be used to signal layers of SU-MIMO UE are to use CSs on a comb 1 with a wider PRB allocation. This leaves comb 0 free for MU-MIMO UEs, such as with CS field configuration 000, 010, 011, 100.

A CS field value of 111 may be used to signal the use of a legacy DM-RS configuration.

As there may be 1 DM-RS symbol in a subframe for some configurations. There is no need to define an OCC when there is only 1 DM-RS symbol in a subframe (area 740). However, OCC are defined for the fall-back configuration 111 (area 750).

In a further exemplary embodiment, the DM-RS combs (such as comb 0 and 1) may be randomized/shuffled between subframes in a cell specific manner. Similar cell specific randomization may be applied between SRS combs.

In another exemplary embodiment, the size of the RS space for DM-RS is configurable (such as via RRC signaling) in order to take into account factors like cell size, average traffic characteristics in a cell, whether or not a cell is part of UL CoMP reception, etc. For example, if there are mostly high UL data rate UEs located within a set of neighboring (small) cells, the eNB can set a minimum BW for PUSCH to be 2 PRBs and increase the size of the RS space for DM-RS (such as beyond the conventional maximum size of 12 for example). This allows the eNB to orthogonalize the DM-RS sequences of different co-allocated UEs to handle situations where the eNB supports a high order UL MIMO and/or the eNB is part of UL CoMP reception cluster. In such scenario, the eNB can benefit from inter-cell orthogonal DM-RS, which is achieved (such as, with simpler scheduling) with an increased space of orthogonal RSs.

Instead of using base sequences of equal length with PUSCH allocations, a set of base sequences may be defined whose length is equal to or greater than a system BW (such as measured in frequency pins) and then apply CSing to the derived full sequences. A UE then selects a portion of one of the cyclically shifted base sequences for its DM-RS sequence. Various exemplary embodiments allow allocations of DM-RS sequences of different UEs (such as within CoMP cluster) onto the same REs via different cyclically shifted versions of the base sequence and, the orthogonality between sequences is retained regardless of their respective PUSCH allocation BWs or mutual alignment of their allocations. Likewise, this allows orthogonal allocation of a number of DM-RS sequences and a number of SRS sequences with arbitrary sequence lengths onto the same REs.

A multiplexing of SRS and DM-RS onto the same REs may also be considered. However, this focuses on the use of a constant RPF for generation of a pilot structure for IFDMA (where the RPF defines the number of available IFDMA combs and, correspondingly, reduces the RS sequence length).

An increased number of available CS values may be used for sounding on SRS resources. However, in order to restore orthogonality of co-allocated sequences, the correlation of sequences at the receiver is calculated over a number of frequency pins equal to the dimensionality of the RS space. Since the minimum PUSCH allocation may one PRB (12 frequency pins), the number of CS values applicable for DM-RS is not increased beyond 12.

Figure 8:
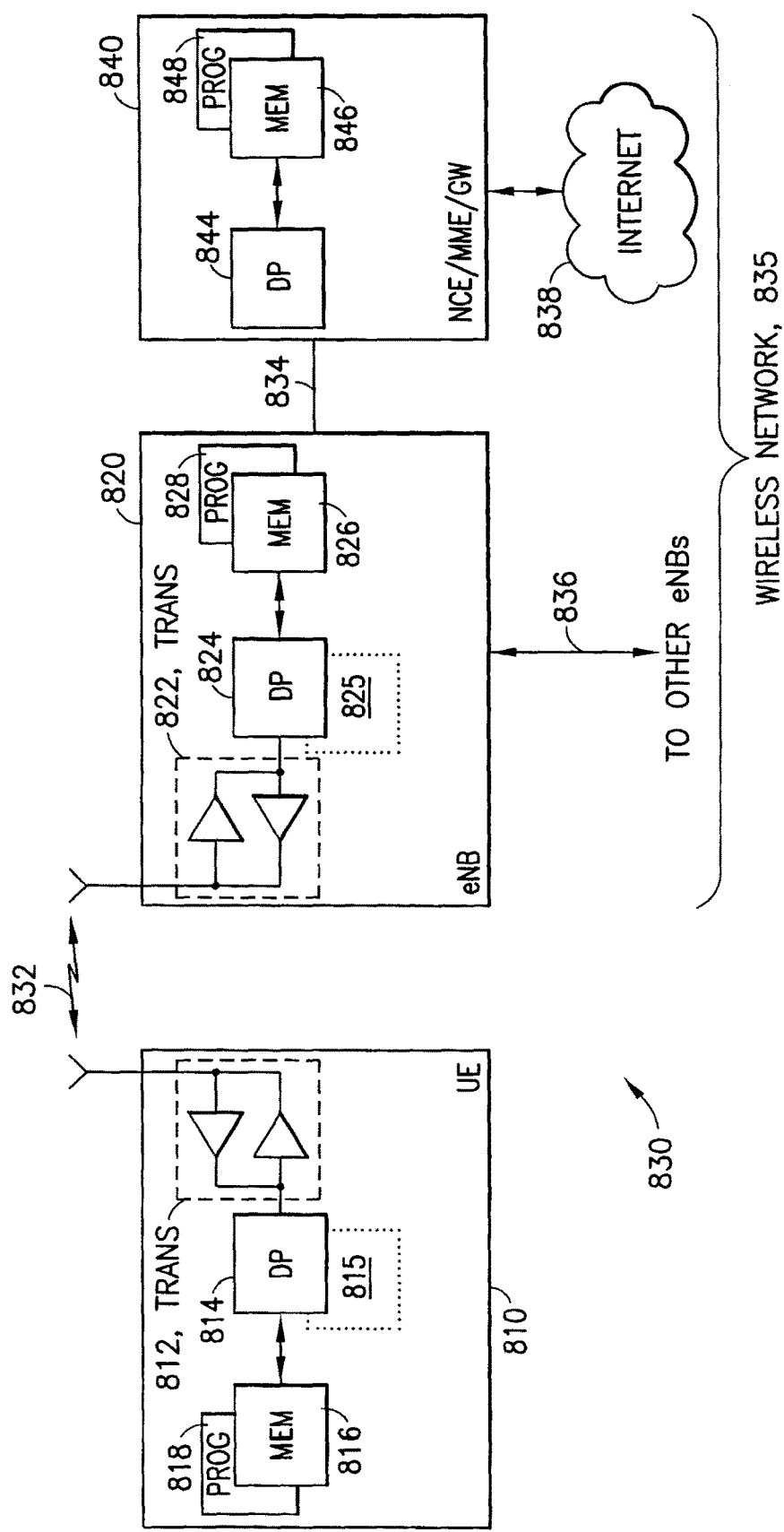
FIG. 8 shows a simplified block diagram of exemplary electronic devices that are suitable for use in practicing various exemplary embodiments.

Reference is made to FIG. 8 for illustrating a simplified block diagram of various electronic devices and apparatus that are suitable for use in practicing exemplary embodiments.

In the wireless system 830 of FIG. 8, a wireless network 835 is adapted for communication over a wireless link 832 with an apparatus, such as a mobile communication device which may be referred to as a UE 810, via a network access node, such as a Node B (base station), and more specifically an eNB 820. The network 835 may include a network control element (NCE) 840 that may include MME/SGW functionality and which provides connectivity with a network, such as a telephone network and/or a data communications network (e.g., the internet 838).

The UE 810 includes a controller, such as a computer or a data processor (DP) 814, a computer-readable memory medium embodied as a memory (MEM) 816 that stores a program of computer instructions (PROG) 818, and a suitable wireless interface, such as radio frequency (RF) transceiver 812, for bidirectional wireless communications with the eNB 820 via one or more antennas.

The eNB 820 also includes a controller, such as a computer or a data processor (DP) 824, a computer-readable memory medium embodied as a memory (MEM) 826 that stores a program of computer instructions (PROG) 828, and a suitable wireless interface, such as RF transceiver 822, for communication with the UE 810 via one or more antennas. The eNB 820 is coupled via a data/control path 834 to the NCE 840. The path 834 may be implemented as a S1 interface. The eNB 820 may also be coupled to another eNB via data/control path 836, which may be implemented as an X2 interface.

The NCE 840 includes a controller, such as a computer or a data processor (DP) 844, a computer-readable memory medium embodied as a memory (MEM) 846 that stores a program of computer instructions (PROG) 848.

At least one of the PROGs 818, 828 and 848 is assumed to include program instructions that, when executed by the associated DP, enable the device to operate in accordance with exemplary embodiments, as will be discussed below in greater detail.

That is, various exemplary embodiments may be implemented at least in part by computer software executable by the DP 814 of the UE 810; by the DP 824 of the eNB 820; and/or by the DP 844 of the NCE 840, or by hardware, or by a combination of software and hardware (and firmware).

The UE 810 and the eNB 820 may also include dedicated processors, for example RS processor 815 and RS processor 825.

In general, the various embodiments of the UE 810 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 816, 826 and 846 may be of any type suitable to the local technical environment and may be implemented using any suitable data storage technology, such as semiconductor based memory devices, flash memory, magnetic memory devices and systems, optical memory devices and systems, fixed memory and removable memory. The DPs 814, 824 and 844 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 812 and 822) may be of any type suitable to the local technical environment and may be implemented using any suitable communication technology such as individual transmitters, receivers, transceivers or a combination of such components.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although not limited thereto. While various aspects of the exemplary embodiments may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments may be practiced in various components such as integrated circuit chips and modules, and that the exemplary embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments.

For example, while the exemplary embodiments have been described above in the context of the E-UTRAN (UTRAN-LTE) system, it should be appreciated that the exemplary embodiments are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., CS, SRS, etc.) are not intended to be limiting in any respect, as these parameters may be identified by any suitable names. Further, the various names assigned to different channels (e.g., PUSCH, etc.) are not intended to be limiting in any respect, as these various channels may be identified by any suitable names.

Furthermore, some of the features of the various non-limiting and exemplary embodiments may be used to advantage without the corresponding use of other features. As such, the foregoing description should be considered as merely illustrative of the principles, teachings and exemplary embodiments, and not in limitation thereof.

The following abbreviations that may be found in the specification and/or the drawing figures are defined as follows:
3GPP third generation partnership project
BS basestation
CoMP cooperative multiple point
CS cyclic shift
DL downlink (eNB towards UE)
DM-RS demodulation reference signal
eNB E-UTRAN Node B (evolved Node B)
E-UTRAN evolved UTRAN (LTE)
IFDMA interleaved frequency domain multiple access
IMT-A international mobile telephony-advanced
ITU international telecommunication union
ITU-R ITU radiocommunication sector
LTE long term evolution of UTRAN (E-UTRAN)
MIMO multiple input multiple output
MU-MIMO multi-user MIMO
Node B base station
OCC orthogonal cover code
PRB physical resource block
PUSCH physical uplink shared channel
RE resource element
Rel release
RPF repetition factor
RRC radio resource control
RS reference signal
S-GW serving gateway
SRS sounding reference signal
SU-MIMO single user MIMO
UE user equipment, such as a mobile station or mobile terminal
UL uplink (UE towards eNB)
UTRAN universal terrestrial radio access network

What is claimed is:

1. An apparatus, comprising at least one processor; and at least one memory including computer program code, the at least one memory and the computer program code configured to, with the at least one processor, cause the apparatus to perform at least the following:

to divide a reference signal space into at least a first region and a second region;

to allocate, from the first region, at least one of a demodulation reference signal sequence cyclic shift and a demodulation reference signal comb for a demodulation reference signal;

to allocate, from the second region, at least one of a sounding reference signal sequence cyclic shift and a sounding reference signal comb for a sounding reference signal, to set a minimum bandwidth of the uplink shared channel and to configure a size of a reference signal space in response to a predefined parameter indicative of an uplink bandwidth usage; and where the demodulation reference signal and the sounding reference signal are on the same resources on an uplink shared channel, where the reference signal space comprises at least one of a cyclic shift set and an interleaved frequency division multiple comb set, and where the at least one of the cyclic shift set and the interleaved frequency division multiple comb set of the first region is based at least in part on a number of physical resource blocks allocated to the uplink shared channel, and wherein at least one of the demodulation reference signal sequence cyclic shift resolution and the demodulation reference signal comb are dependent on the number of physical response blocks allocated to the uplink shared channel.

2. The apparatus of claim 1, where a size of the at least one of the cyclic shift set and the interleaved frequency division multiple comb set on the first region is selected from one of a first size and a second size based at least in part on the number of physical resource blocks allocated to the uplink shared channel.

3. The apparatus of claim 1, where the first region and the second region overlap.

4. The apparatus of claim 3, where at least one of cyclic shift and comb values in both the first region and the second region are used for at least one of an aperiodic sounding reference signal cyclic shift and comb.

5. The apparatus of claim 1, where a size of the reference signal space is based at least in part on at least one of: cell size, cell traffic characteristics, uplink data rates, and uplink cooperative multiple point reception configuration of a cell.

6. The apparatus of claim 1, where allocating the at least one of the demodulation reference signal sequence cyclic shift and the demodulation reference signal comb is based at least in part on a size of the demodulation reference signal sequence.

7. A method comprising:

receiving, by a user equipment, an indication of at least one of a demodulation reference signal sequence cyclic shift and a demodulation reference signal comb for a demodulation reference signal;

receiving, by a user equipment, an indication of at least one of a sounding reference signal sequence cyclic shift and a sounding reference signal comb for a sounding reference signal;

receiving, by a user equipment, a set minimum bandwidth of an uplink shared channel and a configuration of a size of a reference signal space set in response to a predefined parameter indicative of an uplink bandwidth usage;

where the at least one of the demodulation reference signal sequence cyclic shift and the demodulation reference signal comb are from a first region of a reference signal space, where the at least one of a sounding reference signal sequence cyclic shift and the sounding reference signal comb are from a second region of the reference signal space, where the demodulation reference signal and the sounding reference signal are on the same resources on the uplink shared channel, where the reference signal space comprises at least one of a cyclic shift set and an interleaved frequency division multiple comb set, and where the at least one of the cyclic shift set and the interleaved frequency division multiple comb set of first region is based at least in part on a number of physical resource blocks allocated to the uplink shared channel, and wherein at least one of the demodulation reference signal sequence cyclic shift resolution and the demodulation reference signal comb are dependent on the number of physical response blocks allocated to the uplink shared channel;

transmitting, by a user equipment, the demodulation reference signal using the at least one of the demodulation reference signal sequence cyclic shift and the demodulation reference signal comb; and transmitting, by a user equipment, the sounding reference signal using the at least one of the sounding reference signal sequence cyclic shift and the sounding reference signal comb.

8. The method of claim 7, where a size of the at least one of the cyclic shift set and the interleaved frequency division multiple comb set on the first region is selected from one of a first size and a second size based at least in part on the number of physical resource blocks allocated to the uplink shared channel.

9. The method of claim 7, where the first region and the second region overlap.

10. The method of claim 9, where at least one of cyclic shift and comb values in both the first region and the second region are used for at least one of an aperiodic sounding reference signal cyclic shift and comb.

11. The method of claim 7, where a size of the reference signal space is based at least in part on at least one of: cell size, cell traffic characteristics, uplink data rates, and uplink cooperative multiple point reception configuration of a cell.

12. The method of claim 7, where transmitting the demodulation reference signal and the sounding reference signal is performed in the same resource.

13. An apparatus comprising at least one processor; and at least one memory including computer program code, the at least one memory and the computer program code configured to, with the at least one processor, cause the apparatus to perform at least the following:

to receive an indication of at least one of a demodulation reference signal sequence cyclic shift and a demodulation reference signal comb for a demodulation reference signal;

to receive an indication of at least one of a sounding reference signal sequence cyclic shift and a sounding reference signal comb for a sounding reference signal;

to receive a set minimum bandwidth of an uplink shared channel a configuration of a size of a reference signal space set in response to a predefined parameter indicative of an uplink bandwidth usage;
where the at least one of the demodulation reference signal sequence cyclic shift and the demodulation reference signal comb are from a first region of a reference signal space, where the at least one of a sounding reference signal sequence cyclic shift and the sounding reference signal comb are from a second region of the reference signal space,
where the demodulation reference signal and the sounding reference signal are on the same resources on the uplink shared channel,
where the reference signal space comprises at least one of a cyclic shift set and an interleaved frequency division multiple comb set, and
where the at least one of the cyclic shift set and the interleaved frequency division multiple comb set of first region is based at least in part on a number of physical resource blocks allocated to the uplink shared channel, and wherein at least one of the demodulation reference signal sequence cyclic shift resolution and the demodulation reference signal comb are dependent on the number of physical response blocks allocated to the uplink shared channel;
to transmit the demodulation reference signal using the at least one of the demodulation reference signal sequence cyclic shift and the demodulation reference signal comb; and
to transmit the sounding reference signal using the at least one of the sounding reference signal sequence cyclic shift and the sounding reference signal comb.

14. The apparatus of claim 13, where a size of the at least one of the cyclic shift set and the interleaved frequency division multiple comb set on the first region is selected from one of a first size and a second size based at least in part on the number of physical resource blocks allocated to the uplink shared channel.

15. The apparatus of claim 13, where the first region and the second region overlap.

16. The apparatus of claim 13, where at least one of cyclic shift and comb values in both the first region and the second region are used for at least one of an aperiodic sounding reference signal cyclic shift and comb.

17. The apparatus of claim 13, where a size of the reference signal space is based at least in part on at least one of: cell size, cell traffic characteristics, uplink data rates, and uplink cooperative multiple point reception configuration of a cell.

18. The apparatus of claim 13, where transmitting the demodulation reference signal and the sounding reference signal is performed in the same resource.

* * * * *